Figure 1:
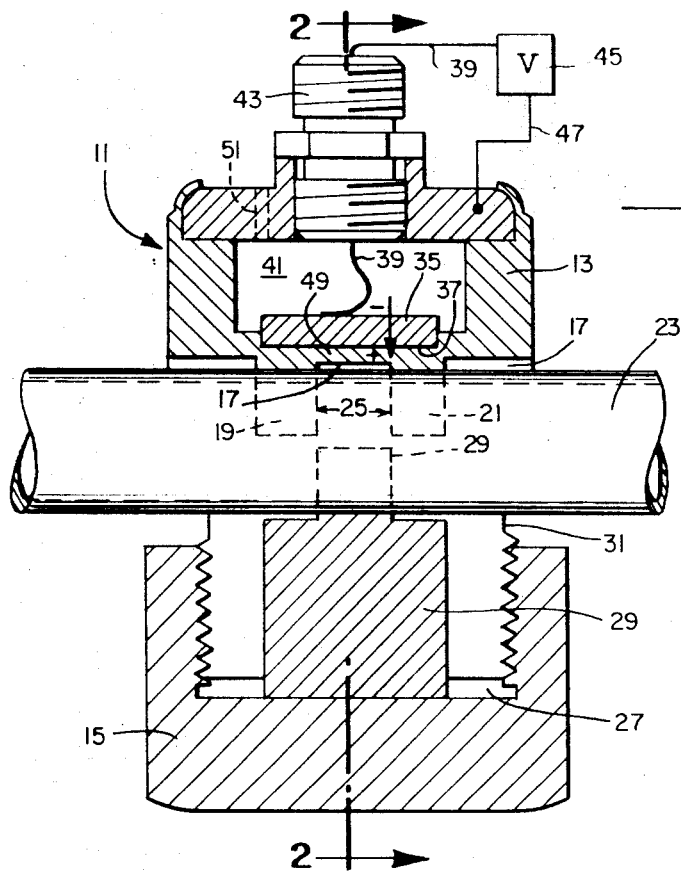

United States Patent

[11] 3,603,152

| [72] | Inventors | Vernon F. Alibert<br>Chester Heights;<br>Thomas H. Carey, Chester, both of, Pa. |
|---|---|---|
| [21] | Appl. No. | 8,821 |
| [22] | Filed | Feb. 5, 1970 |
| [45] | Patented | Sept. 7, 1971 |
| [73] | Assignee | Columbia Research Laboratories, Inc.<br>Woodlyn, Pa. |

[54] TRANSDUCER FOR DETECTING PRESSURE CHANGES IN FLUID FLOW
7 Claims, 2 Drawing Figs.

[52] U.S. Cl. .................................................. 73/398 R
[51] Int. Cl. .................................................. G01l 9/08
[50] Field of Search .......................................... 73/398 AR, 398 R, 406

[56] References Cited
UNITED STATES PATENTS
3,535,937  10/1970  Wiggins et al. ............... 73/398

*Primary Examiner*—Donald O. Woodiel
*Attorney*—William E. Cleaver

ABSTRACT: The present device provides a housing to hold a strain responsive element such as a piezoelectric waferlike crystal. The housing can be fabricated to various sizes depending upon the fluid conduit with which it is to be used. The housing is formed to provide a very firm contact with the fluid conduit and hence any applied force or strain which the conduit experiences serves to stress the piezoelectric crystal. Accordingly, the piezoelectric crystal is very sensitive to any changes of pressure of the fluid within said conduit.

INVENTORS.
VERNON F. ALIBERT
THOMAS H. CAREY
BY William E. Cleaver
ATTORNEY.

TRANSDUCER FOR DETECTING PRESSURE CHANGES IN FLUID FLOW

BACKGROUND

The problem of continually monitoring the pressure of fluid which is flowing in a conduit has generated many efforts at the solution thereof. Heretofore, in general, the monitoring techniques have fallen into three categories.

In the first category, a pressure sensitive device is mounted within the conduit and is subjected to the direct force of the fluid. This particular arrangement has proven to be unsatisfactory for a number of reasons. The pressure of the pressure-sensitive device acts to load the fluid flow and the resulting monitoring signals are altered by the loading, i.e., they are not truly representative of the fluid pressure. In addition, there are a number of difficult problems that arise in connection with the mounting of the pressure sensitive device within the conduit or within a section of conduit which can be coupled into the principal conduit. Further, the kinds of fluid whose pressure can be monitored is limited, because of the harmful effects that certain fluid materials have on the pressure sensitive device per se. For instance, numerous chemicals such as acids would operate on a pressure sensitive device in such a manner as to render the device ineffective.

In the second category, the monitoring devices have been mounted external to the conduit but have been coupled into the conduit so that advantage can be taken of the differential of pressure between the pressure of the fluid in the conduit and the atmospheric pressure. These second category devices are slow responding devices in the sense that any usable signals must be generated by further employing a device to translate mechanical movements (of the fluid in the externally mounted device) into electrical signals.

The third category of devices includes means which are mounted into the side of the fluid conduit and which are exposed to the fluid which passes by. Such a device, by way of example, includes a housing means which has a piezoelectric crystal mounted on one wall and that wall is threaded into a threaded aperture in the side of the conduit. The changes in fluid pressure are transmitted through said one wall to strain the piezoelectric crystal and generate a responsive voltage. These devices have the problem of partial insensitivity because of the threaded mounting and the additional problem of increased cost because of the effort which must be made to seal the aperture into which the housing is mounted so that the fluid will not escape from the conduit. Further, this type of device must have said one wall formed of material which will be unaffected by chemical reactions because said one wall is in direct contact with the fluid and the fluids very often are of a nature to cause a harmful chemical reaction.

SUMMARY

The present device provides a housing means to mount a piezoelectric crystal on the outer surface of a fluid-carrying conduit. The present device has no portion thereof directly exposed to the fluid. The housing means has at least two contact areas in close alignment with said crystal and disposed very firmly in contact with the outer surface of the conduit. The two contact areas are separated from one another. A third contact element is located opposite said separation between said two contact areas and is mounted in said housing means so that when it is moved toward said separation (by tightening said housing means) said two contact areas tend to stress said piezoelectric crystal. Accordingly, said piezoelectric crystal in its "at rest" position is stressed and is thus very sensitive to any changes in pressure in the fluid flowing in the conduit since said changes will be transmitted through said two contact areas to a piezoelectric crystal which is already stressed. It should be understood that while the present invention is described in connection with a piezoelectric crystal, the strain responsive element could be any one of the well-known strain gauge devices.

Figure 2:
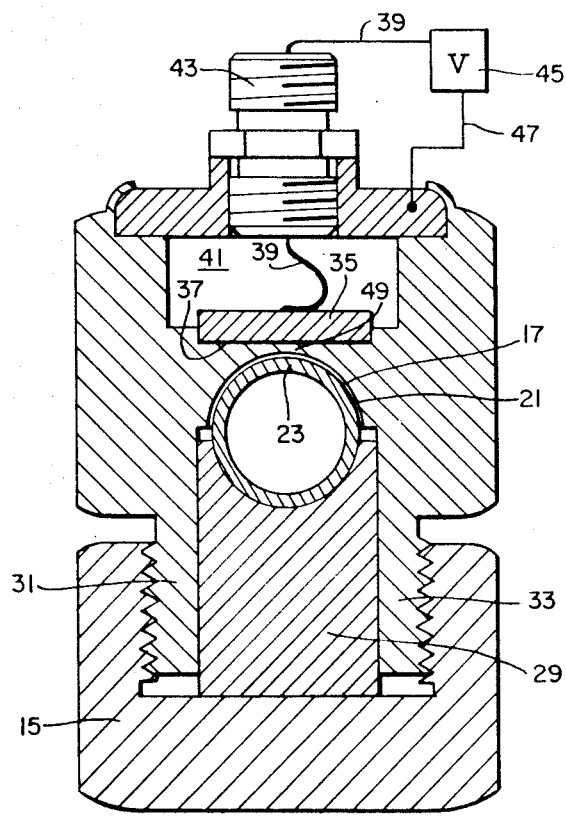

The features and objects of the present invention will be better understood by considering the following description taken in conjunction with the drawings in which:

FIG. 1 is a sectionalized side view, showing a piece of conduit located within the housing; and FIG. 2 is a sectionalized view along the lines 2-2 but with the right-hand section (as viewed) of the housing being shown.

Consider FIG. 1, wherein there is shown a housing means 11. The housing means 11 is composed of two major sections 13 and 15. The major section 13 is the upper section and includes an aperture 17 therein. Formed on the inner upper surface of the aperture 17 are two large contact areas 19 and 21 (which are shown in phantom lying on the reverse side of the fluid conduit 23). The large contact areas 19 and 21 protrude from the upper surface of the aperture 17 so that the contact between the housing 11 and the conduit 23 at the two contact areas 19 and 21. It will be noted that there is a separation 25 between the contact areas 19 and 21 which will become more meaningful hereinafter.

The second major section 15 is the adjustment section. The adjustment section 15 has an aperture 27 formed therein. Within the aperture 27 there is located a support slug 29. As can be better appreciated from FIG. 2, the support slug 29 has a V-shaped upper section into which the conduit 23 fits. The V-shaped upper section is approximately the width of the separation 25 as can be seen in FIG. 1.

The inside wall of the aperture 27 is threaded and the solid sections 31 and 33 of the upper section 13 is also threaded. It will be noted in FIG. 2 that because the aperture 17 runs lengthwise (as related to the conduit 23) through the upper section 13 there are developed two lower solid sections 31 and 33. Because FIG. 1 is a sectionalized view through the middle of the aperture 17, the solid section 31 appears unhatched, i.e., not sectionalized.

Further mounted in the upper section 13 is a piezoelectric crystal 35. While crystal 35 is shown to be waferlike other shapes of piezoelectric crystals can be used. The principle of piezoelectricity is well known and carefully set forth in such texts as "Piezo Electricity", by Walter G. Cody, published by McGraw-Hill Company in 1946 and many other such texts and scientific journals and articles. It is also well known that piezoelectric crystals can be formed of barium titinates and various combinations of lead titinate, lead-zirconates and other materials. The present invention employs such normally formed piezoelectric crystals.

On the lower surface of the piezoelectric crystal 35 is a layer of electrically conducting epoxy 37. Connected to the upper surface of the piezoelectric crystal 35 is a lead wire 39. The lead wire 39 is arranged to pass through the chamber 41, through the connector 43 to a utility device 45. The utility device 45 can be any monitoring system which can receive the electrical signals from the piezoelectric crystal 35 and which can employ these signals to effect a control for the fluid flowing through the conduit 23. The utility device 45 is further connected by means of the wire 47 with the upper section 13. The upper section 13 is made from a rigid, electrically conducting material such as steel, brass or the like. Hence the voltage signal which is generated when the piezoelectric crystal is stressed has a closed circuit path through the epoxy layer 37, through the upper section 13, through the wire 47 to the utility device 45; while the other side of the circuit is from the upper surface of the crystal 35, through the wire 39 to the utility device 45. It should be understood that while the connector layer for the piezoelectric crystal 35 has been (electrically conducting) epoxy resin in the embodiment being described, a layer of any conducting material such as copper, brass, silver or the like, can be employed. Further it should be understood that piezoelectric crystals can be "poled" in a particular direction and in the preferred embodiment the crystal 35 is "poled" as indicated by the arrow with the voltage polarization alongside. Hence when the crystal 35 is stressed, a positive voltage is developed on the epoxy layer side and a negative potential is developed on the lead wire side. The polarities could be reversed.

When the adjustment section 15 is fitted onto the threads of the solid sections 31 and 33 and is threaded upward toward the conduit 23, the support slug 29 is forced against the conduit 23 and the two contact areas 19 and 21 are pulled downward into firm contact with the conduit 23. As the adjustment section 15 is threaded upward beyond the initial contact position (with the conduit 23) of the support slug 29 and the contact areas 19 and 21, the support slug 29 tends to act as a fulcrum and the contact areas 19 and 21 tend to deform the housing wall 49 thereacross. As can be seen in FIGS. 1 and 2, the piezoelectric crystal 35 is solidly secured to the upper section 13 and in particular to the wall 49. The piezoelectric crystal 35 in the present embodiment is secured to, or bonded to, the housing wall 49 by virtue of the electrically conducting epoxy resin 37. Other forms of bonding can be employed however if another form of electrical connecting layer is used.

When the housing wall 49 is deformed (even though the deformation is very slight) the piezoelectric crystal 35 also becomes deformed and hence the piezoelectric crystal is stressed. It should be understood that a stressed piezoelectric crystal is more sensitive to a change in an applied force than is a crystal which has no initial stress thereon (when subjected to that same change in applied force). Accordingly, when there is a difference in fluid pressure developed in the conduit 23 that change in pressure is transmitted to the sides of the conduit 23. This force tends to further stress the housing 11 at the contact areas 19 and 21. Hence the change in fluid pressure in the conduit 23 stresses the piezoelectric crystal through the wall 29 and the piezoelectric crystal 35, in response, generates voltage which is proportional to the stress. The voltage signal is detected by the utility device 45 and is used thereat to monitor or control the fluid flow in the conduit 23. Since the piezoelectric crystal 35 is stressed in its "at rest" position, it is very sensitive to changes in fluid pressure within the conduit. If the device need be made more sensitive, the adjustment section is threaded up tighter and in a like (but opposite) manner, the sensitivity can be reduced by "backing off" on the adjustment section.

As was mentioned earlier, the upper section 13 has a chamber 41 therein. The chamber 41 can be opened to the ambient through the aperture 51 shown in phantom in FIG. 1. If the chamber 41 is opened to the ambient and the ambient is atmosphere then the pressure change detected at the utility device 45 will be measured against atmospheric conditions. On the other hand, the chamber 41 can be evacuated and sealed (plugged up) so that the pressure difference which is detected will represent absolute pressure. In another mode of operation, the chamber 41 can be filled with an inert gas, under pressure, and the pressure difference detected by the utility device 45 will be a relative pressure as measured from the pressurized inert gas.

The present device has the advantages that the sensitive element (piezoelectric crystal 35) is not exposed to the fluid in the conduit and that the housing is easily mounted externally on the conduit. In this regard, the upper section need only be formed to have its aperture 17 be as wide as the conduit 23 and the support slug 29 need only be formed to fit conduit 23. The adjustment means would be formed to fit the upper section and the support slug. It is relatively easy to fabricate the present device to fit various configurations, and hence the present device becomes a means for fitting a large number of fluid carrying conduit.

In addition because the contact areas 19 and 21 are firmly in contact with the conduit 23 and receive any changes in force applied to the conduit 23 and because the piezoelectric crystal is initially stressed, the change in forces transmitted through the contact areas readily generate responsive voltage in the piezoelectric crystal 35.

What is claimed is:

1. A transducer for generating electrical signals in response to changes in fluid pressure in a fluid carrying conduit comprising in combination: housing means having an upper section and an adjustment section; said upper section formed to have a first aperture and having at least first and second contact areas formed in said aperture; said upper section further formed to have means to engage said adjustment section; said adjustment section formed to have a second aperture therein and further formed to have means to engage said upper section; strain responsive means mounted in said upper section in close proximity to said first and second contact areas; support slug means mounted in said second aperture opposite said first and second contact areas and formed to fit said conduit whereby when said adjustment means is engageably moved onto said upper section with said conduit disposed in said first aperture, said support slug is moved toward said first and second contact areas and vice versa so that when said support slug and said first and second contact areas comes in contact with said conduit, said strain responsive means is subjected to strain whereby signals are generated in response to changes in fluid pressure in said conduit.

2. A transducer for generating electrical signals in accordance with claim 1 wherein said strain responsive means is a piezoelectric crystal and wherein said upper section is further formed with a chamber therein and wherein there is further formed a third aperture connecting said chamber with the outer surface of said upper section whereby when said third aperture is left open any change in pressure detected by said piezoelectric crystal is measured against the atmospheric pressure and wherein said chamber can be evacuated and said third aperture sealed to provide differences of pressure representing absolute differences of pressure and wherein said chamber can be filled with a gas under pressure and said third aperture sealed to provide a difference of pressure measured against said pressurized gas.

3. A transducer for generating electrical signals in accordance with claim 1 wherein said strain responsive means is a piezoelectric, waferlike crystal and wherein there is further included electrical means connected to the opposite surfaces of said surfaces of said crystal and adapted to be connected to a utility device.

4. A transducer for generating electrical signals in accordance with claim 1 wherein said strain responsive means is a piezoelectric crystal which is bonded to said upper section in close proximity to said first and second contact areas by an electrically conducting epoxy resin whereby said electrically conducting epoxy resin serves as a connecting surface for one side of piezoelectric crystal.

5. A transducer for generating electrical signals in accordance with claim 1 wherein said upper section is threaded at the portion thereof which engages said adjustment section and said adjustment section is threaded at the portion thereof which engages said upper section.

6. A transducer for generating electrical signals in accordance with claim 1 wherein there is a separation between said first and second contact areas and wherein said support slug has a contact area which is approximately the width of the separation between said first and second contact areas and is disposed opposite said first contact areas to be moved in a different direction therebetween.

7. A transducer for generating electrical signals in accordance with claim 1 wherein said upper section is composed of rigid electrically conducting material.